US009601254B2

(12) United States Patent
Sharp et al.

(10) Patent No.: US 9,601,254 B2
(45) Date of Patent: Mar. 21, 2017

(54) APPARATUS AND METHOD FOR MITIGATING THERMAL EXCURSIONS IN AIR CORE REACTORS DUE TO WIND EFFECTS

(71) Applicant: TRENCH LIMITED, Scarborough (CA)

(72) Inventors: Michael Sharp, Pickering (CA); Mark Gvozdanovic, Stouffville (CA)

(73) Assignee: SIEMENS AKTIENGESELLSCHAFT, München (DE)

( * ) Notice: Subject to any disclaimer, the term of this patent is extended or adjusted under 35 U.S.C. 154(b) by 101 days.

(21) Appl. No.: 14/415,065

(22) PCT Filed: Jul. 23, 2013

(86) PCT No.: PCT/CA2013/050571
§ 371 (c)(1),
(2) Date: Jan. 15, 2015

(87) PCT Pub. No.: WO2014/015431
PCT Pub. Date: Jan. 30, 2014

(65) Prior Publication Data
US 2015/0170818 A1    Jun. 18, 2015

Related U.S. Application Data

(60) Provisional application No. 61/813,807, filed on Apr. 19, 2013, provisional application No. 61/674,971, filed on Jul. 24, 2012.

(51) Int. Cl.
*H01F 27/08* (2006.01)
*H01F 27/28* (2006.01)
(Continued)

(52) U.S. Cl.
CPC .......... *H01F 27/085* (2013.01); *H01F 27/08* (2013.01); *H01F 27/2876* (2013.01); *H01F 37/005* (2013.01); *H01F 27/002* (2013.01)

(58) Field of Classification Search
CPC ........................................... H01F 27/00–27/30
(Continued)

(56) References Cited

U.S. PATENT DOCUMENTS 4,326,181 A * 4/1982 Allen ................... H01F 27/2823
174/DIG. 25
8,410,883 B2 * 4/2013 Asplund ............... H01F 37/005
336/84 C (Continued)

FOREIGN PATENT DOCUMENTS

CA         1114465         12/1981
CN      201383405 Y        1/2010
(Continued)

*Primary Examiner* — Tuyen Nguyen

(57) ABSTRACT

An air core, dry type, power reactor (10) of the type having multiple concentrically positioned winding layers (12) extending along a central axis and above arms (24) of a first spider unit (16) when the reactor is horizontally positioned with respect to a horizontal ground plane, the winding layers (12) arranged in spaced-apart relation providing air gaps (20) between the winding layers allowing air to flow along the winding layers. A deflector (40) is positioned between the winding layers (12) and the ground plane to receive air from wind blowing toward the reactor (10) and guide the air in an upward direction from the deflector (40) and along the gaps (20).

17 Claims, 10 Drawing Sheets

(51) Int. Cl.
*H01F 37/00* (2006.01)
*H01F 27/00* (2006.01)

(58) Field of Classification Search
USPC ...................................................... 336/55–62
See application file for complete search history.

(56) References Cited

U.S. PATENT DOCUMENTS

| | | |
|---|---|---|
| 2005/0280493 A1 | 12/2005 | Edmunds et al. |
| 2010/0117776 A1 | 5/2010 | Israelsson Tampe et al. |
| 2011/0043320 A1 | 2/2011 | Reisinger et al. |
| 2011/0254647 A1 | 10/2011 | Bacarisse |

FOREIGN PATENT DOCUMENTS

| | | |
|---|---|---|
| CN | 201527878 U | 7/2010 |
| WO | 2009026960 A1 | 3/2009 |

\* cited by examiner

US 9,601,254 B2

APPARATUS AND METHOD FOR MITIGATING THERMAL EXCURSIONS IN AIR CORE REACTORS DUE TO WIND EFFECTS

CROSS REFERENCE TO RELATED APPLICATIONS

This application is the US National Stage of International Application No. PCT/CA2013/050571 filed Jul. 23, 2014 and claims benefit thereof, the entire content of which is hereby incorporated herein by reference. This application claims benefit of the 24 Jul. 2012 filing date of U.S. provisional Application No. 61/674,971 and the 19 Apr. 2013 filing date of U.S. provisional Application No. 61/813,807.

FIELD OF THE INVENTION

The present invention relates to dry type air core reactors of the type used in utility and power applications and, more particularly, to a reactor design and method which facilitates cooling of winding layers within the reactors.

BACKGROUND OF THE INVENTION

Air core reactors are inductive devices used in high voltage power transmission, distribution and industrial applications. Configurations and designs include devices which have a number of applications, including filtering out harmonics, shunt devices which compensate for introduction of capacitive reactive power, and devices which limit short circuit currents. Air core reactors are formed with a series of concentrically positioned, spaced-apart winding layers, referred to as packages, in a cylindrical configuration. The winding layers are positioned between upper and lower current carrying members, sometimes referred to as spider units. The spider units comprise a series of arms radiating along a plane and away from a central position in a star configuration.

Among other functions, the spider units may serve as line terminals for connecting power lines and for connecting the winding layers in an electrically parallel configuration. The reactors are normally installed with the spider units in a horizontal orientation with respect to an underlying horizontal ground plane so that the major axis of the cylindrical configuration extends vertically upward from the ground plane. For a single reactor, or for the lower-most reactor in a stacked configuration of two or more reactors, the winding layers are supported above the ground by the lower spider unit and a series of insulators and structural leg members which extend from the lower spider unit to the ground.

The useful life of these reactors can be adversely affected by heat generated in and about the winding layers. With air core reactors typically placed in outdoor environments, conventional designs allow for some cooling by movement of air convection currents between the spaced-apart winding layers. These reactors have openings along the upper and lower spider units, allowing air currents to rise from the underlying ground plane, move along the direction of a central axis and pass above the upper spider unit.

BRIEF DESCRIPTION OF THE DRAWINGS

The invention is explained in the following description in view of the drawings that show.

DETAILED DESCRIPTION OF THE INVENTION

With conventional designs of air core reactors allowing for passive cooling by movement of air convection currents between the spaced-apart winding layers, it might be expected that by allowing air currents to rise from the underlying ground plane, such movement of air through gaps between winding layers could facilitate cooling of the winding layers under wind conditions as well. However, measurements performed under controlled conditions indicate that under mild wind conditions, e.g., on the order of 6 Km/hr, winding temperatures increase significantly. In fact, under such wind conditions, measurable temperature elevations can occur in all winding layers relative to conditions in which there is no wind. The most significant temperature differentials, relative to no-wind conditions, were observed in winding layers positioned between the inner-most and outer-most windings of the reactor. Accordingly, a wind diverter assembly, referred to in this description as a deflector, is provided for incorporation into a reactor to direct wind through cooling duct spaces, or gaps, between and along the winding layers. Tests indicate that with a deflector according to the invention, temperatures in the reactor windings can be reduced to levels observed without the presence of wind conditions. The magnitude of such temperature excursions can be substantially reduced, thereby limiting long term, adverse effects of thermal energy in the winding layers. Tests also indicate that temperatures in the reactor windings can be reduced below levels observed without the presence of wind.

Figure 1A:
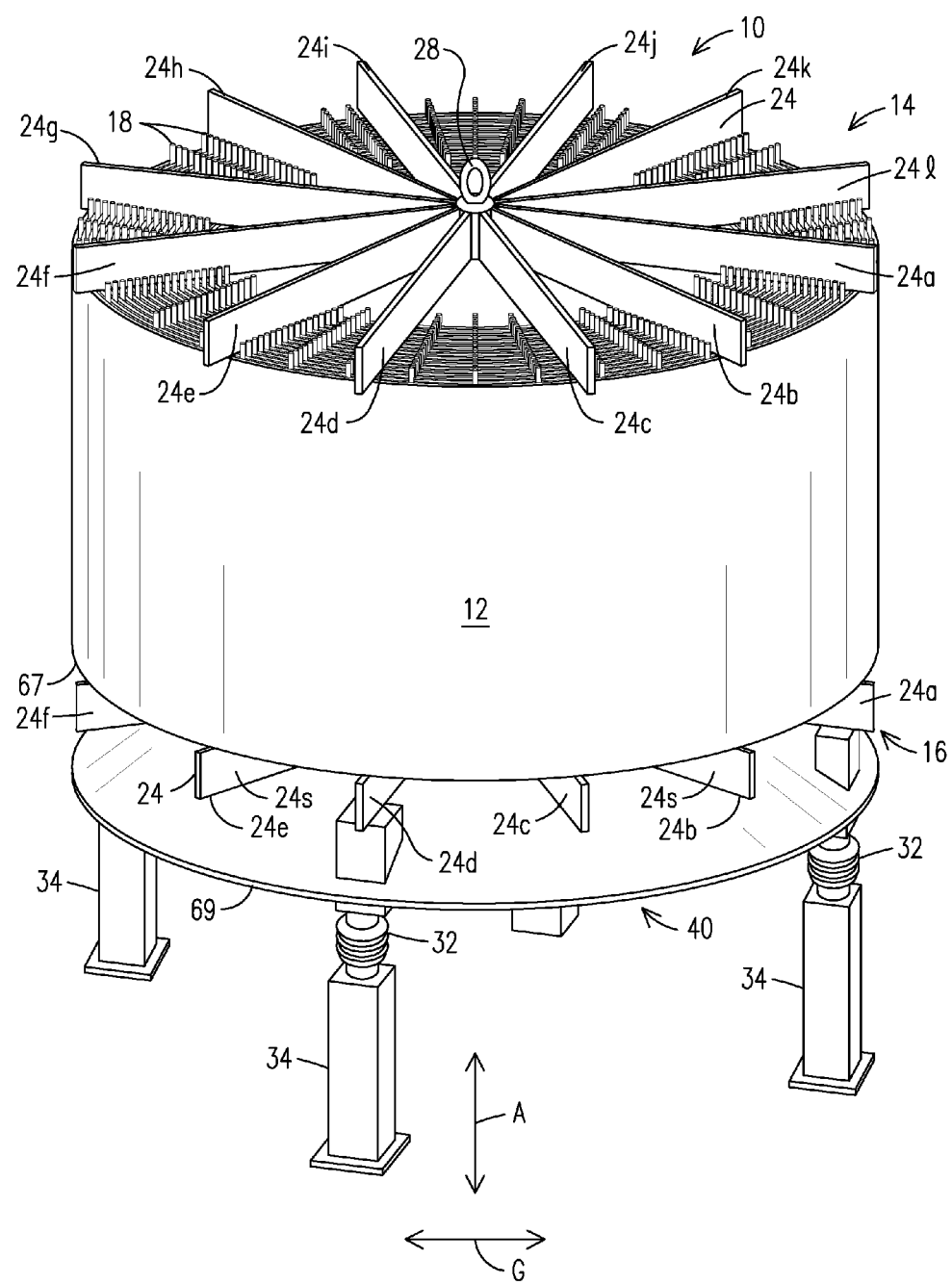
FIG. 1A is an elevation view of an air core reactor incorporating an air deflector according to an embodiment of the invention.
Figure 1B:
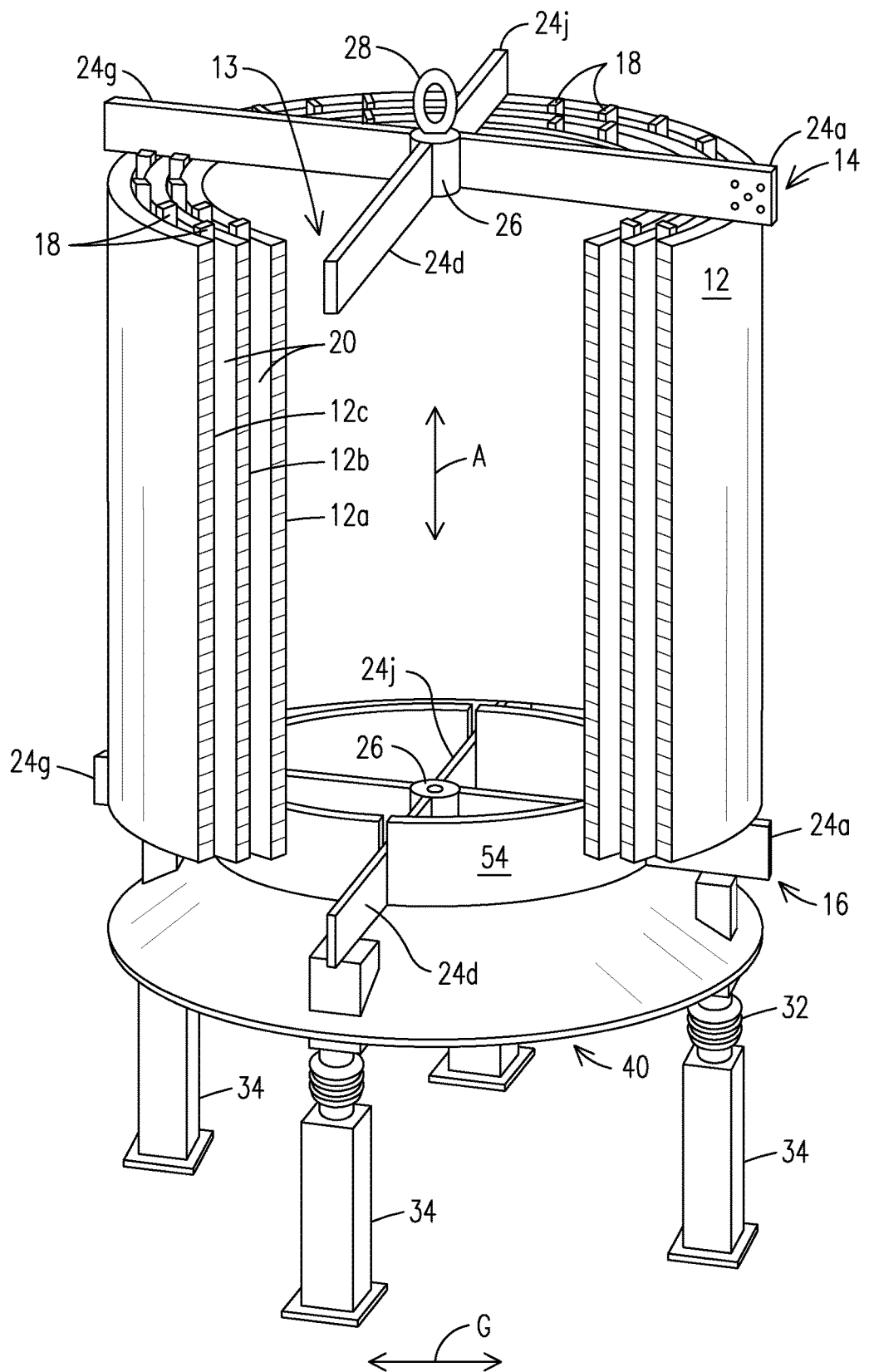
FIGS. 1B and 1C are partial cut-away views illustrating numerous features of the reactor shown in FIG. 1A, including upper and lower spider units.
Figure 1C:
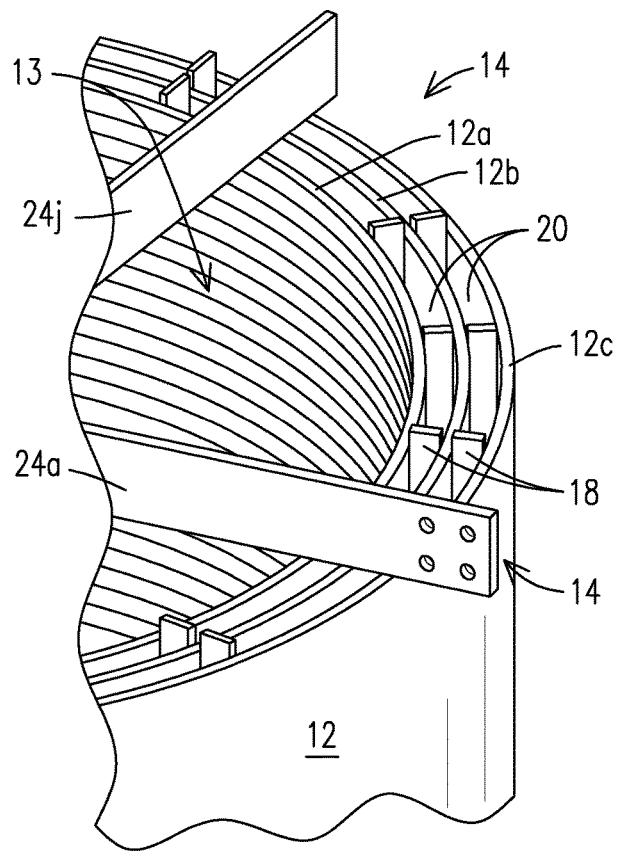

FIG. 1A is an elevation view of an air core, dry type reactor 10, according to an embodiment of the invention. FIGS. 1B and 1C are partial cut-away views of the reactor 10 illustrating components typical of air core reactors. The reactor comprises a series of cylindrically shaped, spaced-apart winding layers 12 concentrically positioned about a central axis, A, of symmetry. The winding layers typically have a thickness range, as measured in the radial direction, on the order of 0.5 to 3 cm and may vary in thickness. Although the reactor 10 may comprise fewer or substantially more winding layers than shown in FIG. 1 (e.g., ranging from fewer than three layers to twenty or more layers), for simplicity of illustration, FIGS. 1B and 1C illustrate only three such winding layers, while FIG. 2 illustrate the reactor 10 having an arbitrary and larger number of winding layers 12. The reactor 10 as illustrated in FIG. 1C includes an innermost winding layer 12a, an intermediate winding layer 12b and an outermost winding layer 12c. The reactor is shown in a common orientation, positioned above a horizontal ground plane, G, with the central axis, A, extending vertically above the ground plane. The reactor 10 includes a hollow reactor cavity 13 extending radially inward from the winding layer 12a toward the axis, A. The cavity 13 and winding layers 12 are positioned between an upper spider unit 14 and a lower spider unit 16. The spider units have horizontal orientations with respect to the underlying ground plane, G.

The layers 12 of winding are separated from one another by spacers 18 which are shown to have a vertical orientation extending in a direction parallel to the axis, A. A series of the spacers 18 is each positioned between each pair of adjacent winding layers. The spacers 18 in each series are circumferentially spaced apart about the axis, A, to provide winding layer air gaps 20 between adjacent pairs of the layers 12. In other embodiments (not illustrated), the reactor may include an outer sheathing or a rigid support structure to which, for example, an electrostatic shield may be attached. See US 2011/0043320 which is incorporated herein by reference. For such embodiments, further spacers may be provided to facilitate separation of the sheathing or a rigid support structure from the outermost layer of winding to also provide an air gap 20. Each winding layer air gap 20 permits a current of air to flow upward along a surface of the winding layer. The exemplary thickness of the winding layer air gaps 20, as measured between the winding layers 12 is typically in the range of 1 to 3 cm as measured in a radial direction outward from the axis, A, and the gap thickness may vary among gaps 20.

The spider units 14, 16 each comprise a series of arms 24 radiating along a plane and away from the axis, A, in a star configuration. The upper and lower spider units 14, 16 in an embodiment of the reactor 10 shown in FIG. 1A each have twelve spider arms 24. For simplicity of illustrating general features of the reactor 10, in FIG. 1B only four spider arms 24 (designated 24a, 24d, 24g and 24j in FIG. 1B) are shown in each of the upper and lower spider units 14, 16 of the reactor 10. The number of arms in the spider units may range from fewer than four to more than twelve arms 24.

Among other functions, the spider arms of the units 14, 16 serve as line terminals (not illustrated) for effecting power connections to and between the winding layers 12, e.g., in an electrically parallel configuration. As shown in FIGS. 1B and 1C, the four exemplary arms 24a, 24d, 24g and 24j of the spider units 14, 16 extend outward from a central hub 26. For purposes of illustrating exemplary features of the invention, the arms 24a, 24d, 24g and 24j of the spider units 14, 16 are shown rotationally spaced ninety degrees apart about a central hub 26 and the axis, A. A lifting eye nut 28 may be affixed to the hub 26 of the upper spider unit 14 to facilitate transport and placement of the reactor 10. In other embodiments, the reactor may be lifted from the arms 24. For a single reactor, and for at least the lower-most reactor 10 when arranged in a stacked configuration of reactors, the winding layers 12 are supported above the ground by a combination of spider arms 24 of the lower unit 16 and a series of structural leg members 34. In the illustrated embodiment four of the arms 24 of the lower spider unit 16 are supported directly by leg members 34 which each extend from a spider arm 24 to the ground. In this embodiment, other spider arms 24 are not directly supported by the leg members but are supported through the spider unit 16 in combination with support provided by the leg 34 members to other arms. In other reactor designs each of the arms of the lower spider unit may be directly coupled to a different leg member for direct support. The leg members 34 of the reactor 10 each include an insulator 32. The number of structural leg members supporting the reactor 10 can vary from fewer than four to more than twelve.

With reference to FIGS. 1, 2 and 3, the reactor 10 includes a wind deflector 40 comprising a base plate 44 mounted beneath the lower spider unit 16. The following description is specific to a twelve arm configuration of the lower spider unit 16 shown in the plan view of FIG. 2A, but it is exemplary of more general designs for deflectors 40 located beneath lower spider units and without regard to a lower spider unit having a specific number of arms 24.

Figure 2A:
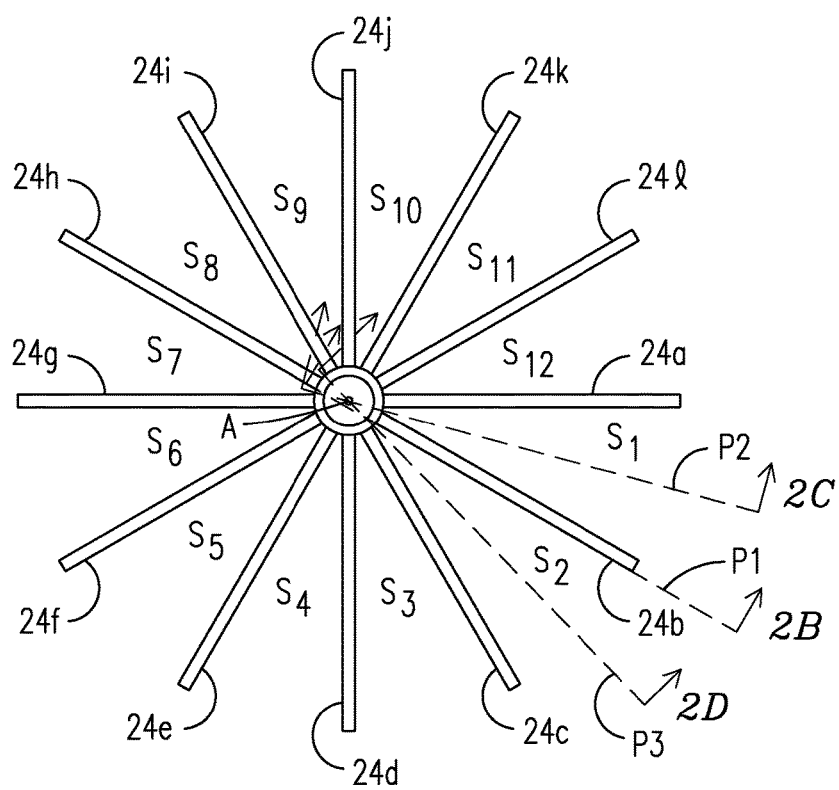
FIG. 2A is a plan view of a lower spider unit of the reactor shown in FIG. 1.

With the lower spider unit 16 having twelve arms 24 as shown in FIG. 2A, the illustrated arms 24 are numbered, clockwise and consecutively $24_a$-$24_l$. Pairs of adjacent arms 24 define twelve, thirty degree sectors, $S_i$, of the spider unit 16, numbered $S_1$ through $S_{12}$, clockwise around the axis, A. For a reactor 10 with a lower spider unit having n arms 24 equally spaced apart, adjacent pairs of the arms 24 of the lower spider unit define n sectors, $S_i$, each subtending 360/n degrees.

Figure 2B:
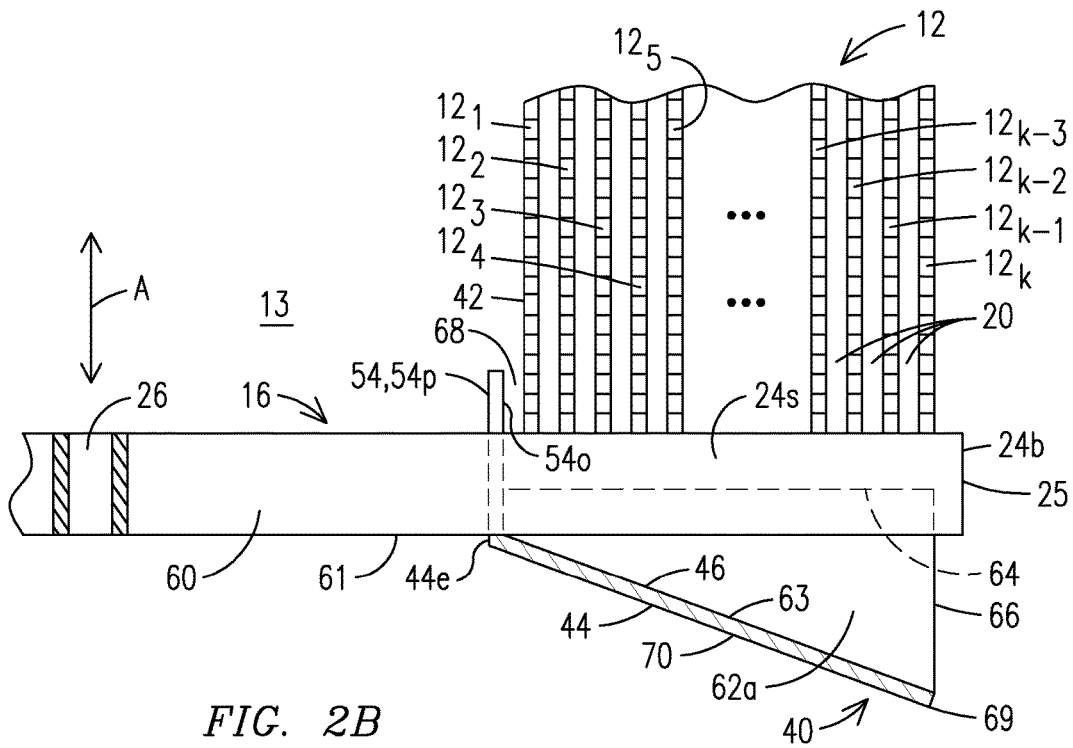
FIG. 2B is a partial schematic cross-sectional view of the reactor shown in FIG. 1, taken along line 2B shown in FIG. 2A.
Figure 2C:
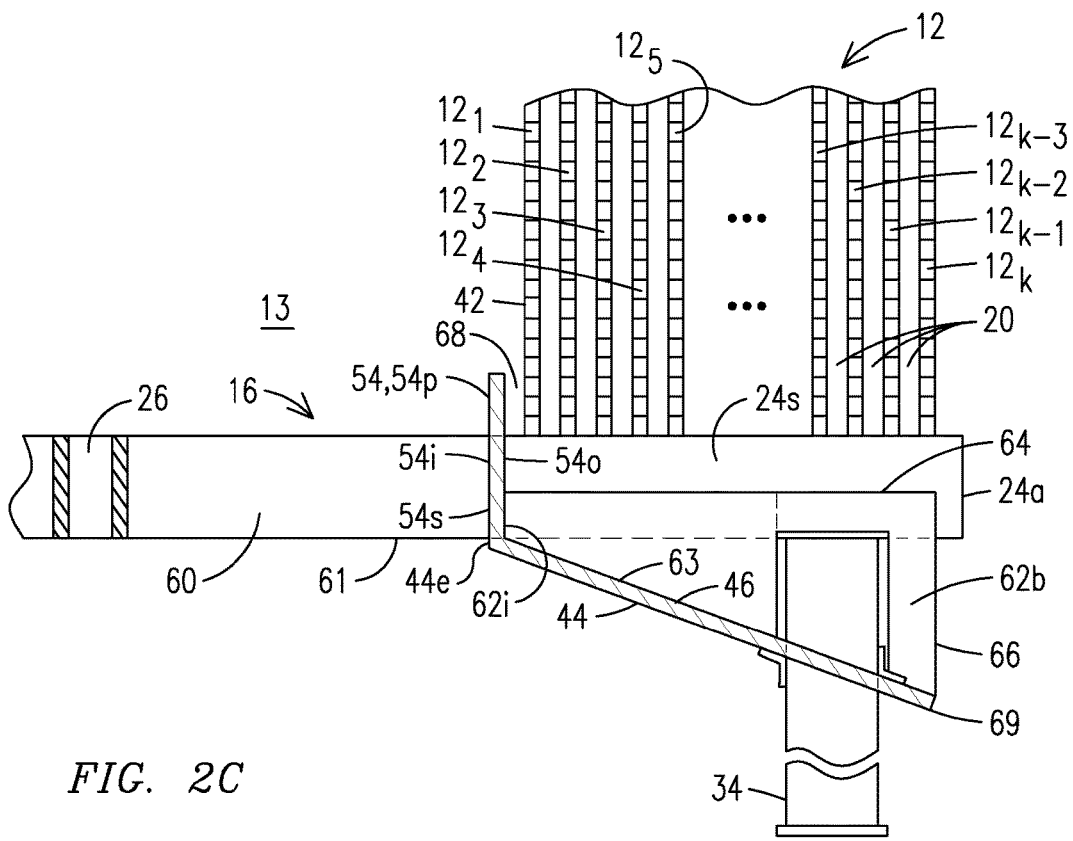
FIG. 2C is another partial schematic cross-sectional view of the reactor shown in FIG. 1, taken along line 2C shown in FIG. 2A.
Figure 2D:
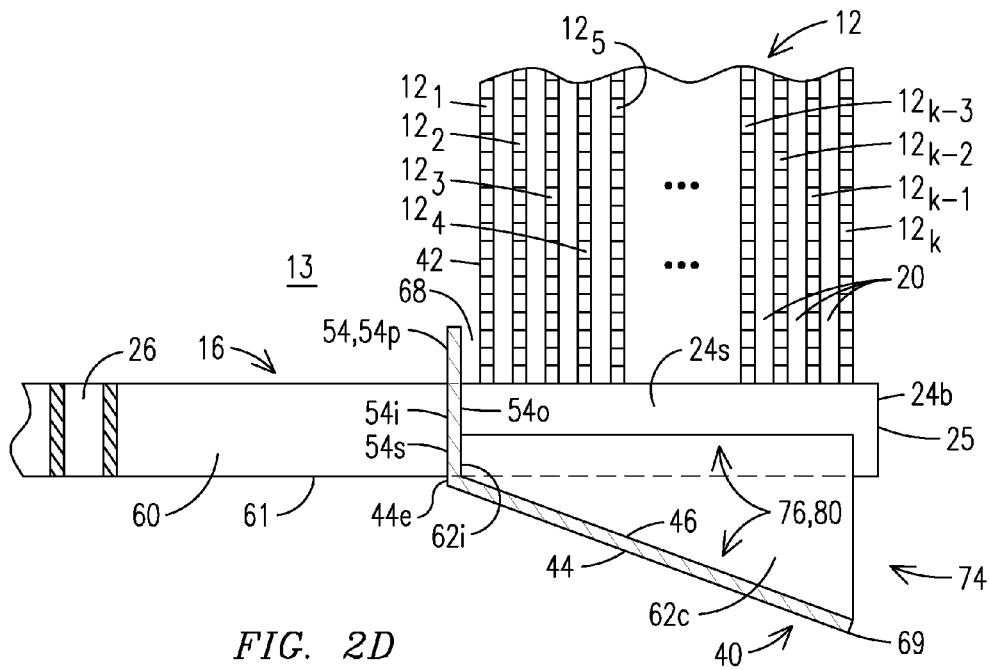
FIG. 2D is another partial schematic view of the reactor 10, taken along line 2D shown in FIG. 2A.

With reference to FIGS. 1B and 2A, FIG. 2B is a partial schematic view of the reactor 10 taken along line 2B, illustrating a portion of the base plate 44. The view of FIG. 2B is taken in front of a plane $P_1$ which passes through the axis, A, and along a surface 24s of one side of arm 24b of the lower spider unit 16. The wind deflector base plate 44 is positioned below the arm 24a. FIG. 2C is another partial schematic view of the reactor 10 taken along line 2C, illustrating another portion of the base plate 44 and a leg member 34. The view of FIG. 2C is taken in front of a plane $P_2$ which passes through the axis, A, and along a surface 24s of one side of arm 24a of the lower spider unit 16. FIG. 2D is another partial schematic view of the reactor 10, taken along line 2D, illustrating still another portion of the base plate 44. The view of FIG. 2D is taken along a plane $P_3$ which passes through the axis, A, and between two adjacent arms 24b and 24c of the lower spider unit 16. FIG. 2D provides a view in front of the surface 24s of a side of the arm 24b.

Figure 2E:
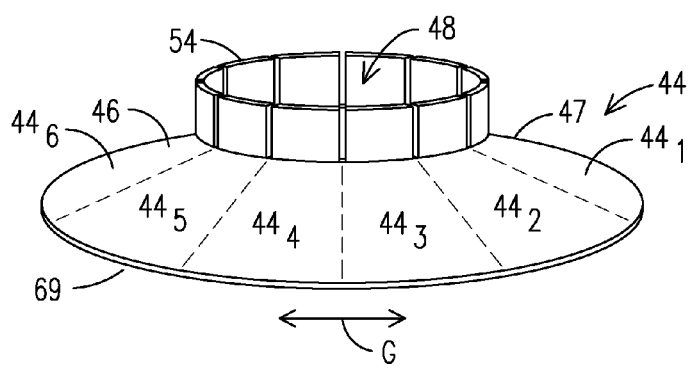
FIG. 2E is a perspective view of a circular baffle wall and a base plate of a wind deflector each having twelve sections.
Figure 2G:
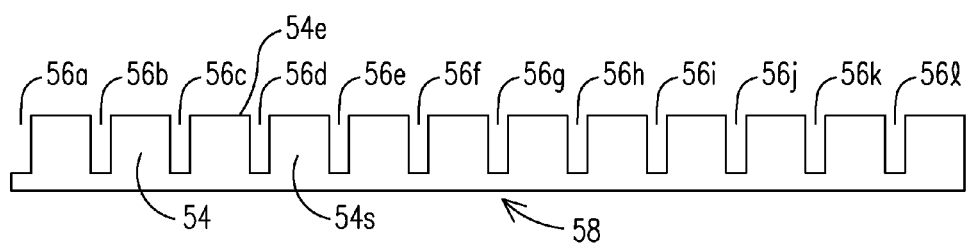
FIG. 2G is an unrolled view of a circular shaped vertical baffle wall shown in FIG. 2C, illustrating a series of slots formed along an upper edge thereof.
Figure 2F:
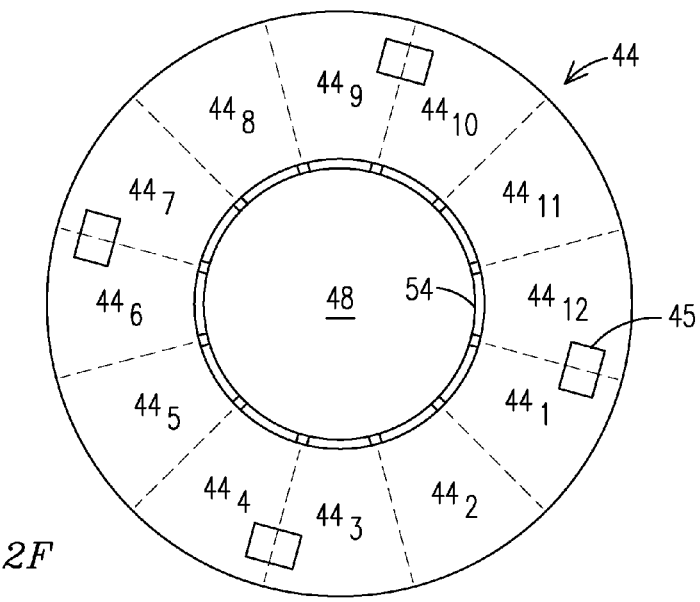
FIG. 2F is a plan view of the base plate shown in FIG. 2E.

With the reactor 10 being of a generic design for which the number of winding layers 12 may vary, a series of k concentric winding layers 12 is indicated in FIGS. 2B-2D, positioned above the lower spider unit 16 and outward from the cavity 13. The innermost layer is designated layer $12_1$ and the outermost layer is designated layer $12_k$. An inner surface 42 of the inner-most winding layer $12_1$ faces the central axis, A. FIG. 2E is a perspective view of the base plate 44 of the exemplary wind deflector 40. FIG. 2F is a plan view of the base plate 44, which is shown as divided into twelve segments $44_1$-$44_{12}$, each vertically aligned with respect to one of the sectors $S_1$ through $S_{12}$ of the lower spider unit 16. That is, sector $S_j$ overlies base plate segment $44_j$. As shown in FIG. 2F, the base plate 44 includes a series of cut outs 45 through which the leg members 34 each extend from one of the spider arms to the ground.

In the embodiment of FIGS. 1-3, the wind deflector base plate 44 is a single body having an upper deflecting surface 46 configured in the shape of a regular cone with the base of the cone facing the underlying ground plane, G. However, instead of forming the base plate 44 with the entire shape of a regular cone (i.e., instead of the upper end of the cone shape converging to a point), the end of the cone shape which would otherwise converge to a point is truncated to provide a frustoconical structure having an interior opening 48 at an upper end 47 of the base plate 44. With the interior opening 48 formed in the base plate 44, air is able to pass (e.g., via a rising convection current) from the ground plane, through the interior opening 48, into the central cavity 13 and then out through the upper spider unit 14. The exemplary interior opening 48 in the base plate 44 may, as illustrated with a conical shaped structure, be of circular shape and concentric with both the axis, A, and the winding layers 12. The exemplary opening 48 has a diameter which extends substantially, but not entirely, across a lower region of the cavity 13. As shown in FIG. 2, a circular shaped vertical baffle wall 54 extends upward from the upper deflecting surface 46 of the base plate 44, near the opening 48, and through the lower spider unit 16. The circular shaped vertical baffle wall 54 may be integrally formed with the base plate 44. The wall 54 has an inner surface 54i facing the axis, A, and an opposing outer surface 54o facing radially outward with respect to the axis, A. The circular vertical wall 54 passes between adjacent pairs of arms 24, e.g., between arms 24a and 24b. The interior of the circular shaped vertical wall 54 receives air passing from the ground plane and through the opening 48 as the air continues to rise upward and into the central cavity 13.

With further reference to FIG. 2, the vertical wall 54 extends from the base plate 44 into the central cavity 13. As shown for the arm 24b in FIG. 2B, the wall 54 extends above the arms 24, but this is not necessary.

In the exemplary embodiment, a circular interior edge 44e of the base plate 44 is defined by the opening 48. The base plate 44 extends toward the arms 24 and the interior edge 44e may contact the arms 24. As shown in the unrolled view of FIG. 2G, the exemplary wall 54 includes a series of slots 56 each extending upward from a lower edge strip 58 to form wall segments 54s between the slots. The slots 56 also extend upward from the base plate upper surface 46 so that individual slots 56 fit about individual arms 24 of the lower unit 16 and slotted upper edges 54e of the wall 54 extend above the spider unit 16 and into the cavity 13. Each slot, numbered clockwise and consecutively $56a$-$56_l$, extends vertically along opposing vertical sides 60 of a corresponding one of the arms $24_a$-$24_l$ (e.g., slot 56a extends along and above the opposing sides 60 of the spider arm $24_a$; and slot $56_b$ extends along and above the opposing sides 60 of the spider arm $24_b$, etc.).

The circular shaped wall 54 is positioned to act in concert with a series of vertical baffle plates 62 to divert movement of wind impinging on the base plate upper surface 46 in an upward direction along and between the winding layers 12. The baffle plates 62 are of two configurations 62a and 62b. The plates 62a, as shown in FIG. 2B, provide a seal along spider arms which are not directly supported by the leg members 34. The plates 62b, as shown in FIG. 2C, provide a seal along spider arms which are directly supported by the leg members 34. See, also, FIG. 3A. Each vertical baffle plate 62a or 62b has an inner vertical sealing edge 62i positioned against the circular shaped vertical wall 54 and an outer vertical edge 66.

Collectively, the vertical wall 54, the vertical baffle plates 62a, 62b and the upper deflecting surface 46 of the baseplate 44 create a baffle structure which guides movement of wind impinging on the upper surface 46, from any horizontal direction, in an upward direction. As shown for one baffle plate 62a and one baffle plate 62b in the elevation view of FIGS. 2B and 2C, the plates 62 each extend vertically from a sealing joint 63 on the upper surface 46 of the base plate 44 in an upward direction. See, also, FIG. 3A which illustrates an arrangement in which the plates 62 each terminate along one of the vertical sides 60 of an arm 24 of the lower spider unit 16. The illustrated baffle plates 62 are flat plates which extend radially outward from the circular shaped vertical wall 54. The illustrated plates 62 are generally in the shape of a right triangle but, as illustrated in the example embodiment, may be trapezoidal in shape, with the inner vertical sealing edge 62i being a fourth side of the plate and positioned against the outside surface 54o of the wall 54. An upper edge 64 of the plate 62 extends along a horizontal direction, terminating on a side 60 of a spider arm 24. The outer vertical side edge 66 extends upward from near the outer periphery 69 of the deflector base plate 44 to near the edge 25 of a spider arm 24 at a radially outward end of the spider arm. The circular shaped wall 54 extends upward from about the base plate interior opening 48 and into the cavity 13. In other embodiments, the circular shaped wall 54 may be integrally formed with the base plate 44, in which case the wall may not include the lower edge strip 58.

In the illustrated embodiment of FIG. 2, the vertical wall 54 extends from the base plate 44 into the central cavity 13. As shown in FIGS. 2B and 2C, the wall 54 may extend above the arms 24, in which case a portion 54p of the circular shaped vertical wall 54 may extend a short distance (e.g., 2.5 to 10 cm or more) upward into the cavity 13. With this arrangement, the outside diameter of the circular shaped wall 54 may be dimensioned to provide an optional baffle air gap 68 between the outer surface 54o of the circular shaped wall 54 and the inner surface 42 of the winding layer $12_1$. By so extending the circular shaped wall 54 to provide the wall portion 54p and the optional gap 68 along part of the inner surface 42 of the inner-most winding layer $12_1$, upward movement of wind from the upper surface 46 can be guided, between the outer surface 54o of the circular shaped wall and the inner surface 42 of the inner-most winding layer $12_1$, to facilitate cooling of the inner-most winding layer.

Together, the base plate 44 and the circular shaped vertical wall 54 are positioned to inhibit wind from moving entirely under and past the winding layers 12, while also permitting rising air, e.g., due to convection currents, to pass through the base plate interior 48 and through the cavity 13. Because the segments 54s of circular shaped baffle wall 54 extend through the lower spider unit arms 24, the wall 54 may be formed with the afore-described slots 56 that fit around opposing sides of individual spider arms. However, in other embodiments, the wall 54 may be formed in discrete arc segments extending between pairs of adjacent spider arms 24, in which case each segment may be attached to each in a pair of adjacent spider arms 20.

The deflecting surface 46 is illustrated as having a constant slope upward from the outer periphery 69 of the deflector base plate 44 toward the interior opening 48, but other contours may be suitable. The lower edge 70 of each baffle plate 62 conforms with the contour and slope along the base deflecting surface 46 (i.e., with respect to the horizontal ground plane) so that the plate 62 serves as a sealing wall which extends radially outward and against the deflecting surface 46 along the joint 63, i.e., from a point at the interface of the outer surface 54o of the baffle wall 54 and the vertical sealing edge 62i to an overlying spider arm 24. The combination of the circular shaped wall 54 and each pair of adjacent baffle plates 62 creates a plenum 72. The wind deflector 40 comprises a series of such plena $72_a$ through $72_l$ as more fully shown in the perspective view of FIG. 3A. Each plenum 72 is formed with or on a segment $44_i$ of the base plate 44 and arranged 360° about the axis, A. See, also, the partial schematic view from above of the deflector 44 in FIG. 3B. The view of FIG. 3B is taken along a plane parallel to and below the lower horizontal surfaces 61 of the lower spider unit arms 24.

In the illustrated embodiment each plenum 72 comprises a pair of baffle plates 62 and, as shown in FIG. 3, there are 24 baffle plates (e.g., 62a or 62b) in the wind deflector. A baffle plate 62 is positioned along each side 24s of each spider arm 24. In other embodiments each plenum 72 may comprise a discrete portion of the base plate 44, e.g., one of the twelve segments $44_1$-$44_{12}$, and adjoining plena may share baffle plates 62 such that there are 12 baffle plates instead of 24 baffle plates in the exemplary wind deflector. See FIG. 5.

As illustrated in FIG. 2D, each plenum 72 has an intake opening 74 for receiving wind and an outlet 76. The intake opening 74 of each plenum 72 is defined by the lower edge 67 of the outermost winding $12_k$, the outer periphery 69 of the deflector base plate 44 and the outer side edges 66 of the two adjacent plenum baffle plates 62. The outlet 76 is between the upper edges 64 of adjacent baffle plates 62 and between the circular shaped baffle wall 54 and the lower edge 67 of the outermost winding $12_k$. The outlet 76 is open to the lower spider unit 16 (i.e., in fluid communication with the lower spider unit) so that wind exiting the outlet can pass through the lower spider unit, i.e., between adjacent spider arms 24, to enter the gaps 20 between the winding layers 12. In this arrangement, with each plenum including both the circular shaped baffle wall 54, positioned on the base plate symmetrically about the axis, A, and a base plate segment $44_i$, each plenum is, essentially, an open chamber having an air intake opening 74 and an air outlet 76.

With the wind deflector 40 comprising the series of plena 72 positioned completely about the axis, A, the deflector can receive wind from any direction into the opening 74 in one or more plena 72 and divert the wind so that the air travels in an upward direction through the winding layer air gaps 20 as well as through the baffle air gap 68 so that the moving air can provide heat transfer along inner and outer surfaces of each winding layer $12_i$.

Figure 4A:
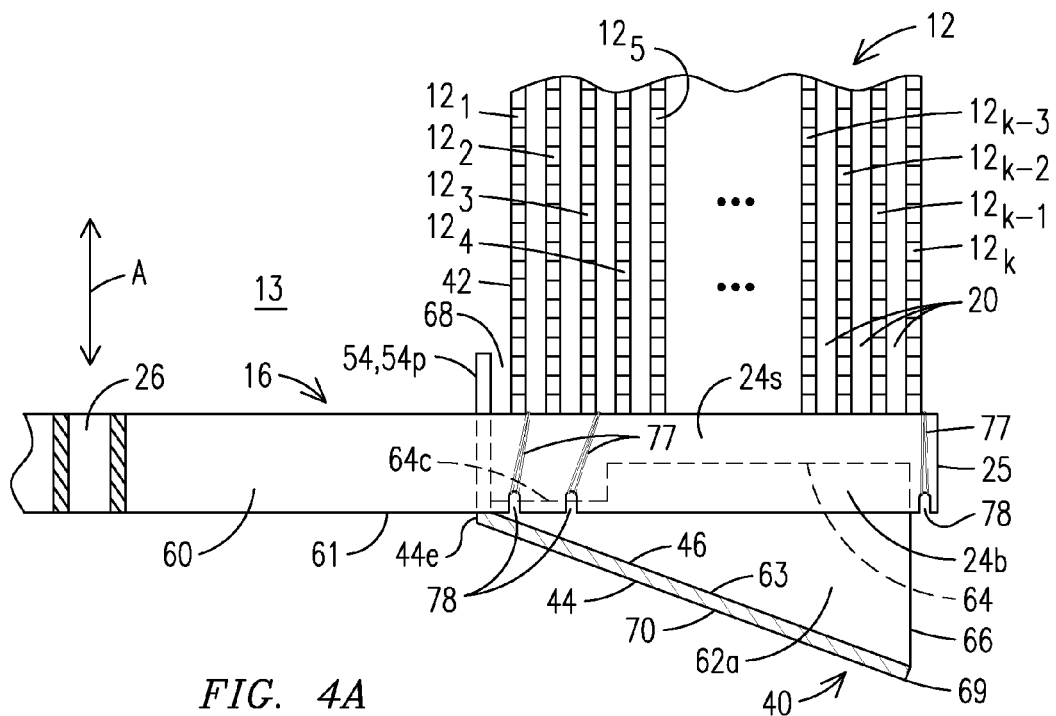
FIG. 4A is a partial schematic view of the reactor 10 taken along line 2B shown in FIG. 2A, illustrating an alternate embodiment of a baffle plate shown in FIG. 2B.
Figure 4B:
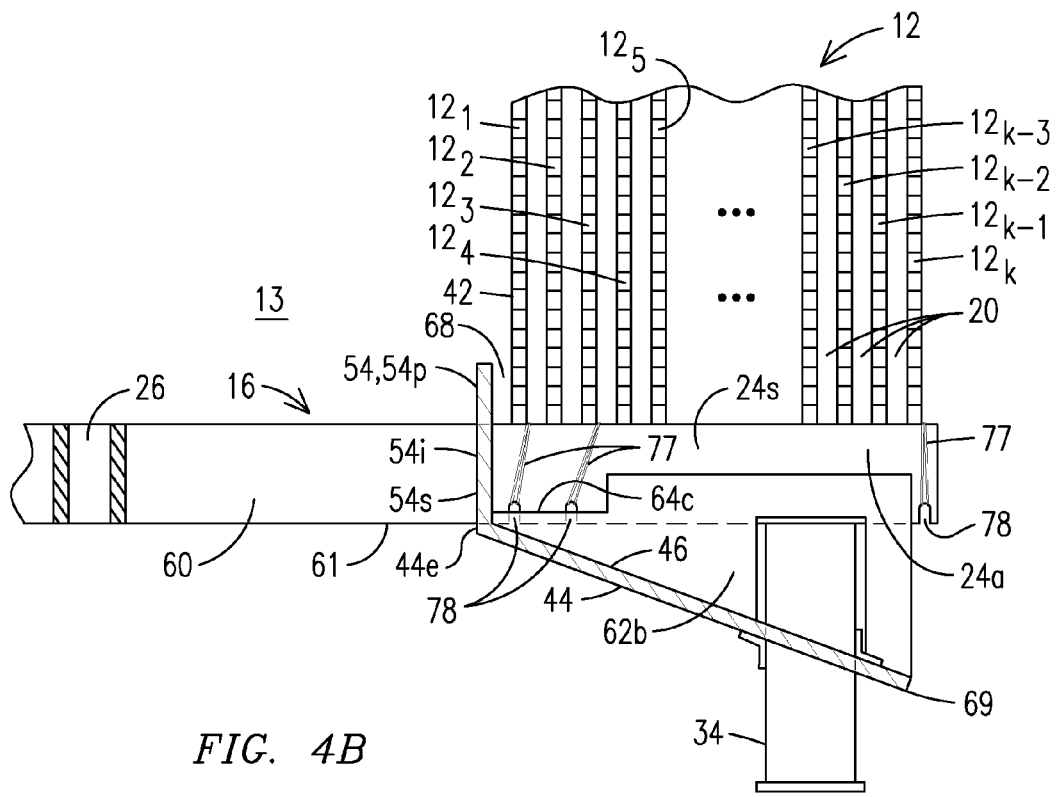
FIG. 4B is another partial schematic view of the reactor 10 taken along line 2C shown in FIG. 2A, illustrating an alternate embodiment of a baffle plate shown in FIG. 2C.

Numerous variations in the design and shape of the baffle plates 62 are contemplated to provide flexibility in reactor design, accommodate tie down restraints and avoid interference with mechanical or electrical connections. FIGS. 4A and 4B illustrate variants of the baffle plates 62a and 62b shown in FIGS. 2B and 2C. FIG. 4A is a partial schematic view of the reactor 10, like that of FIG. 2B, taken along line 2B shown in FIG. 2A and in front of the plane $P_1$, along a side surface 24s of arm 24b of the lower spider unit 16. FIG. 4B is another partial schematic view of the reactor 10, like that of FIG. 2C, taken along line 2C shown in FIG. 2A. The view of FIG. 4B is taken in front of a plane $P_2$ and along the side surface 24s of the arm 24a of the lower spider unit 16. FIG. 4A illustrates a variant of the baffle plate 62a and FIG. 4B illustrates a variant of the baffle plate 62b. Each of the baffle plates 62a and 62b as shown in FIGS. 4A and 4B incorporates a cutout 64c along the upper edge 64 to accommodate a series of tie down straps 77 that extend from several of the winding layers 12. The straps 77 may be formed as fiberglass resin composite materials bonded to the winding layers which are typically coated with a fiberglass resin composite material. The straps 77 each extend from a winding layer 12, under the spider arms 24, and back to a winding layer 12. The straps 77 may each be fit within a recess 78 along the lower horizontal surfaces 61 of a spider arm. Notwithstanding variations in the baffle plates 62 illustrated in the figures, including provision of additional sides, the illustrated plates 62 are generally triangular in shape with variations along edges, e.g., to accommodate straps, electrical connections, etc. In lieu of forming cutouts the upper edges of the baffle plates can include tabs or other appendages which are positioned against the surfaces 24s of sides of the arms 24. It is to be understood that the numerous variants in baffle plate design and in design of plenum units are interchangeable among the numerous embodiments. It is also to be recognized that the illustrated tie down straps and placement of these straps is exemplary of a variety of configurations and that other tie down configurations are contemplated. Generally, the baffle plates 62 may be shaped accordingly to provide clearances and openings for mechanical and electrical components.

Those skilled in the art will readily recognize that there are numerous designs and fabrication methods according to which a deflector may be designed and incorporated into the reactor 10 to divert the direction of the wind to flow between the gaps 20. In the disclosed embodiments, an opening 80 formed by the series of discrete plenum outlets 76, extends completely, i.e., 360 degrees, around the deflector 40. The opening 80 is partitioned by the series of plenum baffle plates 62, each extending upward in a vertical direction from the deflector 40 to one of the arms 20 of the lower spider unit 16. Numerous other arrangements of plena can effect the same function or a similar function as that described for the embodiments shown in FIGS. 1-3. For example, each plenum 72 may be formed as a complete and discrete unit comprising (i) a segment $44_i$ of the base plate 44, (ii) a wall segment 54s and (iii) a pair of baffle plates 66, similar to one of the arrangements shown in FIG. 3A. Providing each plenum as a modular unit facilitates field retrofits of existing reactors to incorporate wind deflectors.

In other embodiments, the modular plenum units may be designed to be spaced apart from one another about the axis, A. Differing designs of modular plenum units are contemplated to suit a variety of reactors which vary in reactor size and to provide variations in cooling performance. One specific example is illustrated in FIG. 5. More generally, a single design of modular plenum units may be adapted for installation in reactors which vary in size or vary in the number of spider arms with use of brackets or spacers and the like. Such applications of standardized plenum units for different spider arm sizes can facilitate rapid, lower cost installation of wind deflectors providing acceptable levels of cooling to winding layers.

Figure 3A:
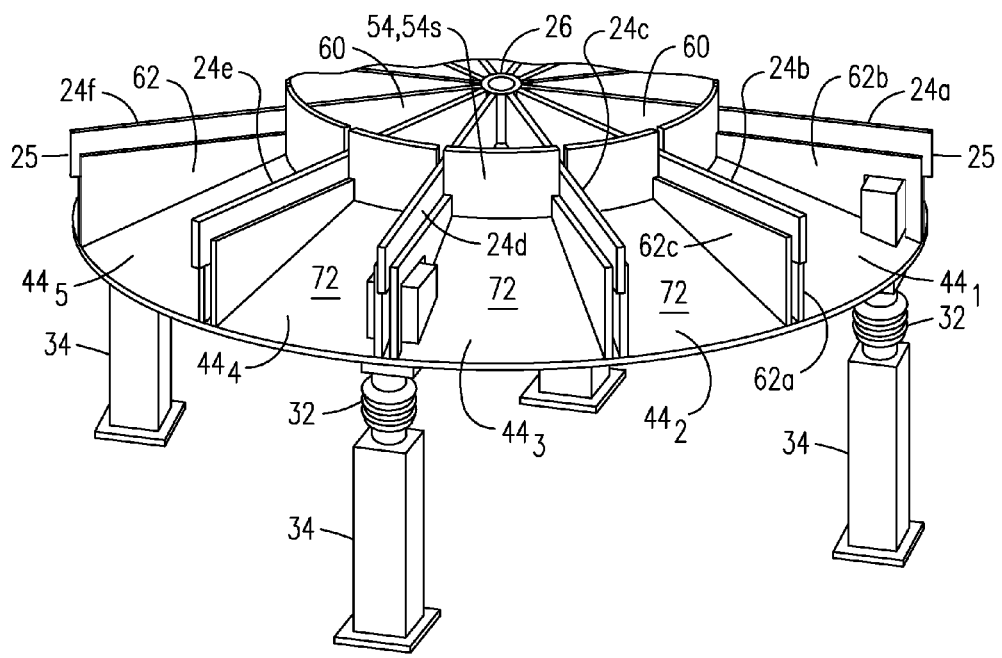
FIG. 3A is a partial perspective view of the reactor illustrating components of multiple plena formed with the base plate shown in FIG. 2.
Figure 3B:
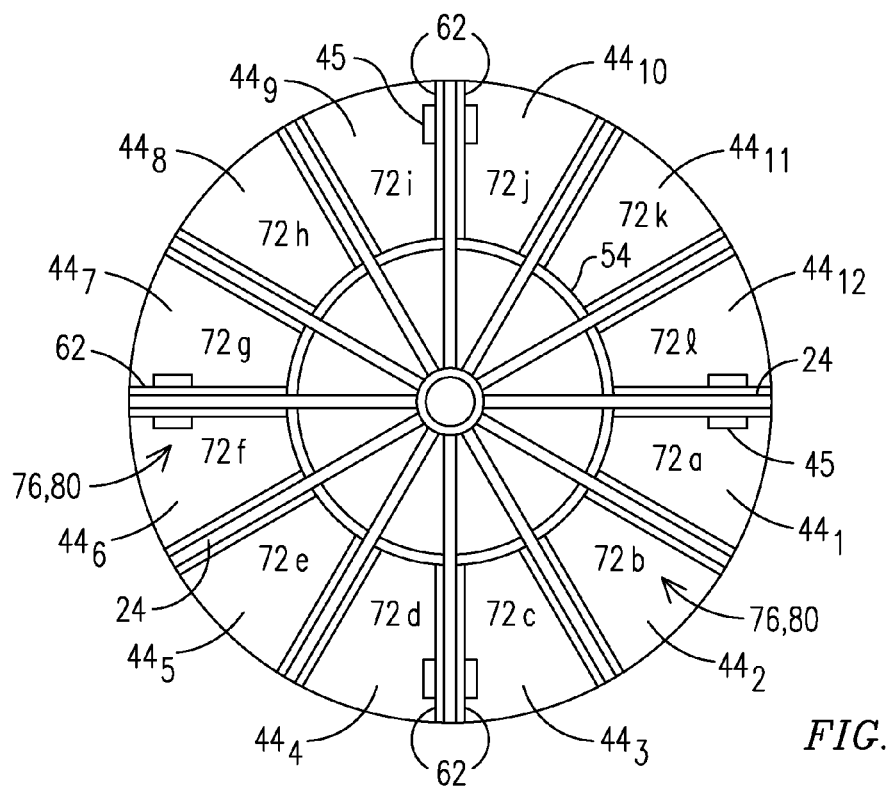
FIG. 3B is a plan view of a series of twelve plena each formed with a base plate segment and arranged 360° about a central axis.
Figure 3C:
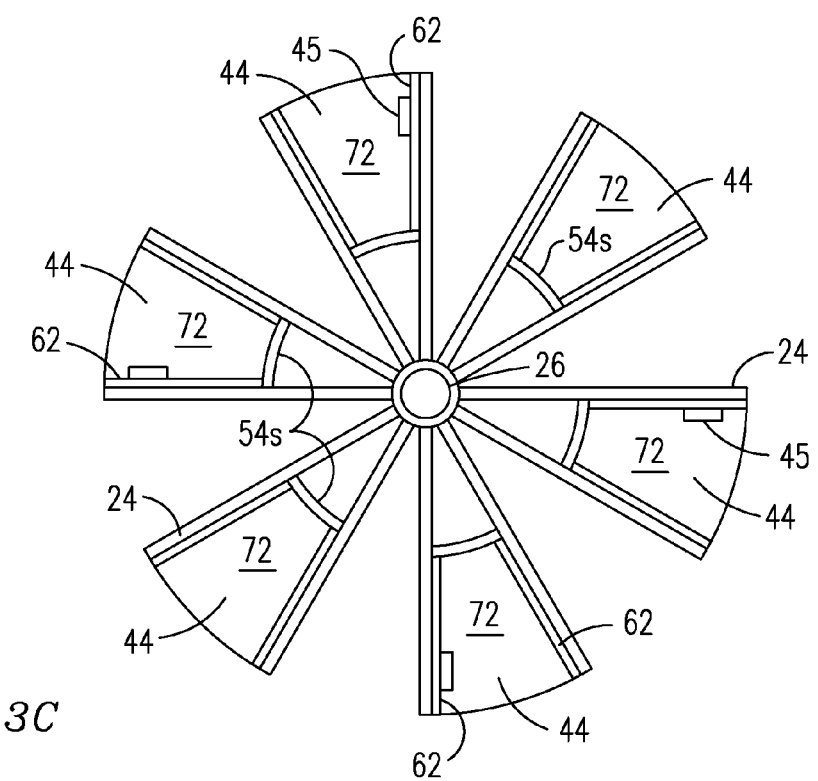
FIG. 3C is a plan view which illustrates an arrangement of six plena according to an alternate embodiment of the invention.

When implementing other embodiments with a modular plenum design, the number of plena may remain the same as described for the deflector 40 shown in FIG. 3A, but with each plenum subtending a smaller angle, or there may be fewer plena. In either case, the resulting configuration may have spaces between plena or between plena and adjacent spider arms. The plena need not be uniformly spaced apart. The plan view of FIG. 3C illustrates implementation of uniform spacing between plena with such modularity in a wind deflector comprising six plena. In lieu of providing a base plate 40 as one monolithic unit as shown in FIG. 2D, six in the series of twelve base plate segments $44_i$ (e.g., $44_1$, $44_3$, $44_5$, $44_7$, $44_9$, $44_{11}$) are provided as discrete units while the other six base plate segments (e.g., $44_2$, $44_4$, $44_6$, $44_8$, $44_{10}$, $44_{12}$) are omitted. Each of the discrete base plate units which are retained forms a portion of one plenum 72. With spaces positioned between adjacent plena, air can flow through such spaces and into the reactor cavity 13.

In the embodiment of FIG. 5, a series of modular plenum units are provided to install a wind deflector 90 functionally equivalent to the wind deflector 40 shown in FIG. 1. As shown in FIGS. 5A, 5B and 5C, three plenum units 92*a*, 92*b* and 92*c* are monolithic constructs each comprising one of the base plate segments 44*i*, one vertical baffle wall 62 and one segment 54*s* of the circular shaped vertical wall 54. Each plenum unit comprises a base member 44*i*, a vertical plate 62 and a vertical wall member 54*s* corresponding to one of the wall segments of the circular wall 54. The base member 44*i*, the vertical plate 62 and the vertical wall member 54*s* are attached to one another to form a single unit. By way of example, they may be integrally formed as one unit (e.g., as a fiberglass composite structure) or they may be assembled into a single structure with fasteners. Each plenum unit base member is sized to fit beneath the lower spider unit, and between a pair of other plenum unit base members. When each base member is positioned with the deflecting surface 46 facing away from the ground plane, G, the vertical plate and the vertical wall member are positioned to extend upward and away from the ground plane and the base member to serve as baffles members for deflecting wind. When a series of the plenum units is installed in the reactor, as shown in FIGS. 5D and 5E, the combination of each plenum unit with a vertical plate of an adjoining plenum unit, provides a plenum capable of deflecting wind entering the plenum unit in an upward direction to pass through the air gaps 20 between winding layers 12. In other embodiments, not all of the plenum units 92 need have a segment 54*s* corresponding to the circular shaped vertical wall 54 attached to the base member 44*i*. For example, in an assembled system comprising a series of plenum units there may be an alternating arrangement of spaced apart vertical wall segments.

Consistent with the shape of the deflector base plate 44 shown in FIGS. 1 and 2, when the combination of the vertical plate 62 and the base member 44; of each plenum unit 90 is installed (e.g., when the plates 62 of all of the plenum units 90 are installed against the sides 24*s* of the arms 24), the plenum units each define a base plate slope (a positive gradient toward the axis, A) while the vertical wall member 54*s* occupies a substantially vertical orientation.

Figure 5A:
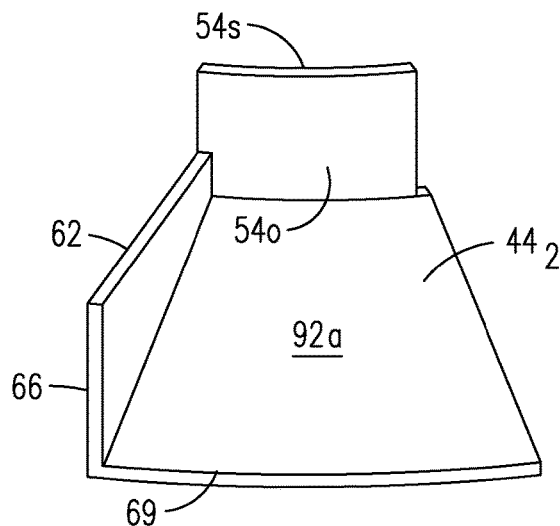
FIGS. 5A, 5B and 5C are perspective views of a series of plenum units which are monolithic constructs for modular assembly of a wind deflector according to the invention.
Figure 5B:
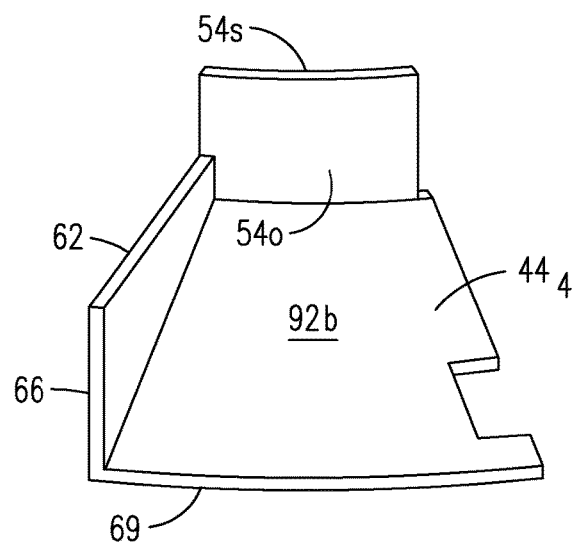
Figure 5C:
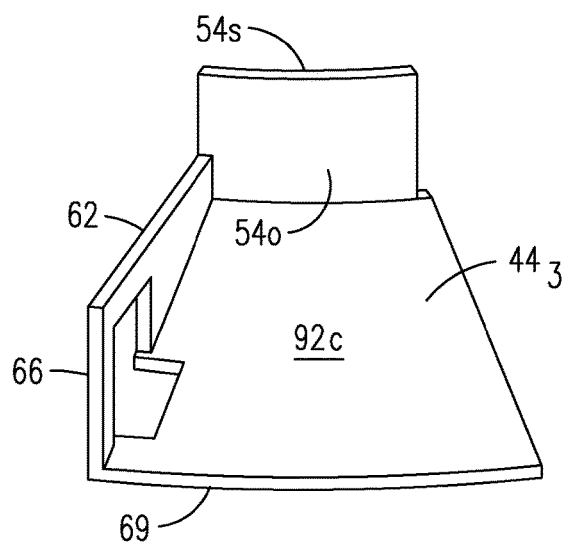
Figure 5D:
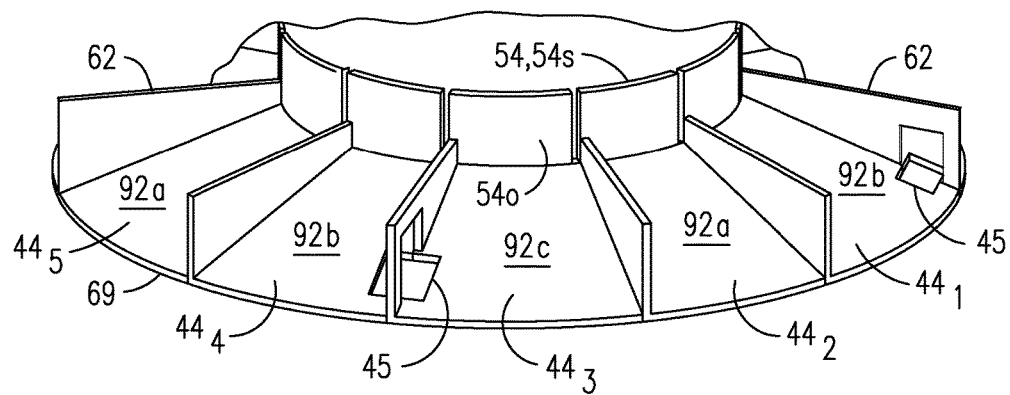
FIG. 5D is a partial perspective view of the wind deflector assembled with the modular plenum units of FIGS. 5A, 5B and 5C.
Figure 5E:
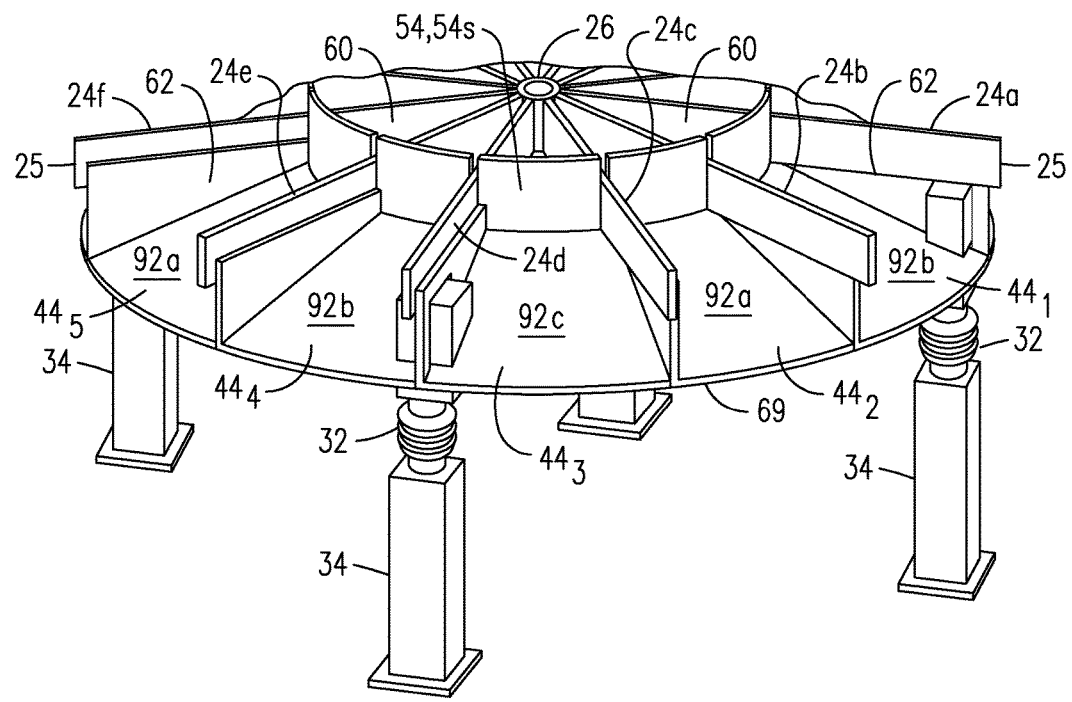
FIG. 5E is a partial view of a reactor incorporating the wind deflector shown in FIG. 5D.

It is to be understood that for a custom application the particular number of different plenum units and the design of each plenum unit may result from specific features of the reactor design (e.g., the number of arms 24 on the lower spider unit, and the number of leg members 34). Other modular designs may utilize only one design of a plenum unit 92 for all of the units used to create a wind deflector. FIG. 5D is a partial view of the of the wind deflector 90 illustrating assembly of the modular plenum units 92*a*, 92*b* and 92*c* to form a functional equivalent of the wind deflector 90. FIG. 5E is a partial view of the reactor 10 illustrating assembly of the wind deflector 90 therein. With the modular units 90 it is possible to install the wind deflector without removal of the reactor from the leg members 34. The modular units 90 can be fastened directly to the arms 24 of the lower spider unit 16. In FIG. 5 and other embodiments it is to be understood that the baffle plates 62, although illustrated as similar in shape to those shown in FIG. 3A, may be of varied shapes, including those illustrated in FIGS. 2, 3 and 4. Similarly, the circular shaped vertical baffle wall 54, and associated baffle wall segments 54*s* are not limited to the particular designs illustrated.

For a reactor having lower spider unit arms extending radially 167.5 cm (67 in) from the axis, A, and the inner surface 42 of the winding layer 12₁ positioned 118 cm (46.5 in) from the axis, the deflector 40 may have the following approximate dimensions:

radius of deflector base plate interior opening 48 and circular shaped vertical wall 54: 116 cm (46 in),
radius of outer periphery 69 of deflector base plate 44: 167.5 cm (67 in),
baffle plate length along upper edge 64: 52 cm (20.5 in),
baffle plate height along side edge 66 up to bottom surface of arm 24: 20 cm (8 in),
slope of deflector base plate from horizontal: 22°.

The slope of the deflector base plate 44 along the lower edge 70 of each vertical baffle plate 62 may range from zero to sixty degrees or more. Reference to the base plate having a positive slope, e.g., 22°, corresponds to height of the base plate increasing as the distance to the axis, A, decreases.

Functionally, deflectors according to the invention act like air scoops which direct the flow of wind impinging upon the surface 46 so that the air moves upward along the cone-like deflector base plate 44. The surrounding walls, e.g., the circular shaped vertical wall 54 and a pair of adjacent plates 62, further constrain movement of the wind so that the moving air is diverted primarily in an upward, vertical direction, to pass through the air gaps 20 and through the upper spider unit 14. Functionally, the deflector 40 captures wind which would otherwise pass under the reactor and which would not otherwise pass through the gaps 20 to assure that at least a portion of the wind is directed to pass through the gaps 20.

Having observed that, under even mild wind levels, undesirable temperature elevations can occur in reactor windings, particularly in those reactor winding layers between the inner-most and outer-most winding layers, there has been disclosed a deflector and a method which limit the temperature excursions of hot spots which become prevalent under wind conditions. By directing wind, which would otherwise pass under a reactor, upward and into air gaps between and around the winding layers, the otherwise large temperature excursions are mitigated. For example, during wind tests it was observed that when the temperature of the winding layer is measured at the point along the reactor circumference facing the direction from which the wind is traveling, the temperature excursions attributable to presence of the wind were reduced to about the temperatures observed with no wind present and, in some portions of winding layers, in specific segments $44_i$, the temperatures were reduced to below the temperatures observed with no wind present.

One set of measurements indicated, for one particular winding layer, an excursion under wind conditions of approximately 30 degrees C. above the no wind condition was actually reversed to 30 degrees C. below the no wind condition with installation of a deflector according to the invention. Generally, incorporation of the deflector 40 into a reactor design can provide reductions in temperature excursions in coil winding layers under wind conditions. Because the magnitude of such temperature excursions can be substantially reduced, use of the deflector may be especially beneficial in those reactors subject to steady winds for long durations of time. The deflector can extend the lifetime of the reactors with enhanced cooling provided by the wind.

Advantageously, the disclosed design does not require any forced flow of air for cooling purposes but, instead, provides benefits when wind conditions arise. Further, with the deflector base plate 44 and the circular shaped vertical baffle wall 54 providing an opening into the reactor cavity 13, the design permits natural air circulation through the gaps 20 and along the inner surface 42 of the inner-most winding layer $12_1$. The deflector 40 provides cooling benefits which reduce thermal excursions under wind conditions while sustaining the benefits associated with circulation of air through the reactor in the absence of winds.

While various embodiments of the present invention have been shown and described herein, it will be apparent that such embodiments are provided by way of example only. For example, while the disclosed embodiments describe a deflector located below a reactor cavity 13, the invention is not so limited. Wind deflection may force air currents between winding layers in upward or downward directions, and a deflector could be mounted above a reactor cavity, above the winding layers or above an upper spider unit. Numerous other variations, changes and substitutions may be made without departing from the invention concepts disclosed herein. Accordingly, it is intended that the invention be limited only by the spirit and scope of the claims which now follow.

The claimed invention is:

1. An air core, dry type, power reactor of the type having multiple concentrically positioned winding layers extending along a central axis and above arms of a spider unit when the reactor is horizontally positioned with respect to a horizontal ground plane, the winding layers arranged in spaced-apart relation providing air gaps between the winding layers allowing air to flow along the winding layers, comprising:
    a deflector positioned to receive air from wind blowing toward the reactor and to guide the air in a vertical direction from the deflector and through the gaps,
    wherein the deflector comprises a plenum including a base plate and a plurality of vertical walls extending upward from the base plate, an intake opening to the plenum for receiving the air and an outlet from the plenum through which received air is directed upward toward the gaps.

2. The reactor of claim 1 wherein the deflector is positioned between the winding layers and the ground plane.

3. An air core, dry type, power reactor of the type having multiple concentrically positioned winding layers extending along a central axis and above arms of a spider unit when the reactor is horizontally positioned with respect to a horizontal ground plane, the winding layers arranged in spaced-apart relation providing air gaps between the winding layers allowing air to flow along the winding layers, comprising:
    a deflector positioned to receive air from wind blowing toward the reactor and to guide the air in a vertical direction from the deflector and through the gaps, wherein the deflector comprises a series of plena integrally formed with the base plate, each of the plena extending away from the central axis, wherein:
    the series of plena is positioned around the axis; and
    each of the plena is defined by a plurality of vertical walls extending upward from the base plate, an intake opening for receiving the air and an outlet through which received air is directed upward toward the gaps.

4. The reactor of claim 3, wherein the base plate includes a cutout through which a leg member of the reactor extends.

5. The reactor of claim 3, wherein at least one vertical wall defines a portion of each of two adjacent plena.

6. The reactor of claim 3, wherein each plenum comprises two vertical walls unique to that plenum.

7. The reactor of claim 3, wherein the deflector includes a base plate comprising a plurality of separate portions.

8. The reactor of claim 3, wherein the deflector comprises a single base plate having an outer periphery which extends about the central axis and an inclined surface which rises from the outer periphery toward the central axis.

9. The reactor of claim 1, wherein the base plate is frustoconical in shape.

10. The reactor of claim 1 wherein the reactor comprises an air cavity between the central axis and an inner-most one of the winding layers, and the base plate comprises a central opening through which air may travel from below the reactor into the cavity.

11. The reactor of claim 10, further including a vertical plate extending about the central opening, above the first spider unit and into the air cavity along an inner surface of the inner-most winding layer.

12. The reactor of claim 1, wherein the deflector comprises a series of plena integrally formed with the base plate, each of the plena extending away from the central axis, wherein:
    the series of plena is positioned around the axis; and
    each of the plena is defined by a plurality of vertical walls extending upward from the base plate, an intake opening for receiving the air and an outlet through which received air is directed upward toward the gaps.

13. The reactor of claim 12, wherein the base plate includes a cutout through which a leg member of the reactor extends.

14. The reactor of claim 12, wherein at least one vertical wall defines a portion of each of two adjacent plena.

15. The reactor of claim 12, wherein each plenum comprises two vertical walls unique to that plenum.

16. The reactor of claim 12 wherein the deflector includes a base plate comprising a plurality of separate portions.

17. The reactor of claim 12, wherein the deflector comprises a single base plate having an outer periphery which extends about the central axis and an inclined surface which rises from the outer periphery toward the central axis.

\* \* \* \* \*